2,820,786

THIAMINE 3-CARBOXY- 5 -HYDROXY-1-p-SULFO- PHENYL - 4 - SULFOPHENYLAZOPYRAZOLATE AND A METHOD FOR OBTAINING THE SAME

Ryuichi Yamamoto, Uchide, Ashiya-shi, Masao Harada, Otsu-shi, and Tetsuya Takahashi, Amagasaki-shi, Japan, assignors to Shionogi & Co., Ltd., Higashi-ku, Osaka, Japan No Drawing. Application March 6, 1956
Serial No. 569,687

2 Claims. (Cl. 260—154)

This invention relates to a novel compound, thiamine 3 - carboxy - 5 - hydroxy - 1 - p - sulfophenyl - 4 -sulfophenylazopyrazolate and a method for obtaining the same.

Recently, the demand for thiamine as a medical and nutritional element has increased remarkably. At present, numerous preparations containing thiamine are sold as multi-vitamin preparations or in other forms.

However, since ordinary thiamine chloride hydrochloride is considerably unstable in powdered form due to the influence of moisture, many investigations have been directed to obtaining a new thiamine compound, more stable than thiamine chloride hydrochloride to moisture.

New thiamine salts such as thiamine nitrate and thiocyanate thus obtained are hardly soluble in water and non-hygroscopic, and they tolerably satisfy the need for a stabilized thiamine to moisture.

However, lately it has been discovered that ascorbic acid which is almost always dispensed with thiamine preparation harmfully affects the stability of thiamine. According to our investigation, ascorbic acid in contact with thiamine decomposes the thiamine and causes a decrease in the vitamin activities and/or the coloring of the composition.

This fact is not related to the solubility or hygroscopicity of the thiamine compound. Our experimental results show that thiamine nitrate is less stable than thiamine chloride hydrochloride in the presence of ascorbic acid in spite of its superiority as a nutriment of flour.

In this connection, we carried out further investigations and obtained the novel thiamine compound which is more stable to ascorbic acid compared with other known thiamine compounds. The novel salt, thiamine 3 - carboxy - 5 - hydroxy - 1 - p - sulfophenyl - 4 - sulfophenylazopyrazolate stated in the specification was created to satisfy the above-mentioned need, as the results of continuous investigations. This novel compound is obtained by the reaction of the water-soluble salts of thiamine with the water-soluble salts of 3-carboxy-5-hydroxy-1-p-sulfophenyl - 4 - sulfophenylazopyrazole in an aqueous medium.

This salt is highly stable to moisture and ascorbic acid. Moreover, this salt is substantially harmless since 3 - carboxy - 5 - hydroxy - 1 - p - sulfophenyl - 4 - sulfophenylazopyrazole which is the one of the components of the said novel salt is a harmless edible dye commonly known as "tartrazine" or FD&C Yellow No. 5.

Our novel thiamine salt is a yellow, fine crystal, melts at 223–225° C., and is soluble in water 1.76 w./v. percent at 37° C. and slightly soluble in ethanol. In addition, the salt is strongly positive to thiochrome reaction and negative to Beilstein's reaction for Cl'.

From the results of investigations on the molecular weight and water-content, infra-red and ultra-violet spectra, elemental analysis, assay of thiamine base and paper chromatography, the novel compound consists of three thiamine molecules and two molecules of tartrazine and has the following empirical formula

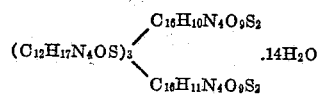

The maximum absorption bands of the compound exist in 258 and 428 m$\mu$.

To determine the stability of the novel salt, several thiamine salts including this novel salt were admixed with ascorbic acid in lactose respectively, and stored under circumstances in which the relative humidity was either 84% or 72% at 37° C. respectively.

The remaining thiamine and ascorbic acid in these mixtures were assayed by the para-aminoacetophenone method and iodine method respectively. The data of these tests are as follows.

The samples and composition:

(A) Thiamine 3 - carboxy - 5 - hydroxy - 1 - p - sulfophenyl-4-sulfophenylazopyrazolate (corresponding to 0.05 g. of thiamine chloride hydrochloride)+0.50 g. of ascorbic acid+1.95 g. of lactose.

(B) 0.05 g. of thiamine chloride hydrochloride+0.50 g. of ascorbic acid+1.95 g. of lactose.

(C) Thiamine mononitrate (corresponding to 0.05 g. of thiamine chloride hydrochloride)+0.50 g. of ascorbic acid+1.95 g. of lactose.

(D) 0.05 g. of thiamine chloride hydrochloride+1.95 g. of lactose (control).

(E) 0.50 g. of ascorbic acid+1.95 g. of lactose (control).

The following table shows that said tartrazine salt of thiamine is very stable compared with thiamine chloride hydrochloride or thiamine mononitrate under the co-existence of ascorbic acid. This was an entirely unexpected and unobvious result.

The novel compound, thiamine 3-carboxy-5-hydroxy-1-p-sulfophenyl - 4 - sulfophenylazopyrazolate is obtained by reacting water-soluble salts of thiamine with water-soluble salts of 3-carboxy-5-hydroxy-1-p-sulfophenyl-4-sulfophenylazopyrazole in and aqueous medium. As the result of the reaction, the difficulty soluble reaction product is precipitated and easily isolated by filtration or by centrifuging from the reaction mixture. The refrigeration of reaction mixture further accelerates the precipitation of the reaction product.

In this reaction, whole water-soluble salts of thiamine and whole water-soluble salts of tartrazine are available as the reactants without exception. Chloride hydrochloride, bromide hydrobromide, iodide hydroiodide, sulfate, and dinitrite of thiamine may be illustrated as examples of the water-soluble salts of thiamine.

On the other hand, alkali metal salts of tartrazine such as lithium, sodium or potassium tartrazinates may be referred as the illustration. It is considered that the invention encompasses all of the conventional salts of thiamine and 3 - carboxy-5-hydroxy-1-p-sulfophenyl-4-sulfophenylazopyrazole.

| Samples | Testing humidity, percent | Period of storage | | | | Outward aspect |
|---|---|---|---|---|---|---|
| | | 10 days | | 30 days | | |
| | | Remaining percentages of included vitamins | | | | |
| | | Thiamine | Ascorbic acid | Thiamine | Ascorbic acid | |
| A | 84 | 96.5 | 89.6 | 91.8 | 88.1 | No variation was observed. |
| | 72 | 98.2 | 91.5 | 94.5 | 91.0 | |
| B | 84 | 90.4 | 83.9 | 72.2 | 78.1 | Slightly browning. |
| | 72 | 91.3 | 87.5 | 76.2 | 85.9 | |
| C | 84 | 65.6 | 65.3 | 36.6 | 56.9 | Greatly browning, moistened. |
| | 72 | 84.7 | 86.2 | 55.6 | 63.4 | |
| D | 84 | 96.8 | | 92.4 | | No variation was observed. |
| | 72 | 97.8 | | 93.8 | | |
| E | 84 | | 96.0 | | 91.7 | Do. |
| | 72 | | 98.3 | | 94.8 | |

Example 4 g. of thiamine chloride hydrochloride and 4 g. of sodium 3 - carboxy - 5 - hydroxy - 1 - p - sulfophenyl-4-sulfophenylazopyrazolate were dissolved in 150 cc. of water. The solution was filtered and then was cooled with ice to precipitate the reaction product.

Thus, 5 g. of the reaction product, thiamine 3-carboxy-5 - hydroxy - 1 - p - sulfophenyl - 4 - sulfophenylazopyrazolate, was obtained. The melting point is 223–5° C. (recrystallized from hot water).

Having thus described our invention, we claim:

1. The chemical compound, thiamine 3-carboxy-5-hydroxy-1-p-sulfophenyl-4-sulfophenylazopyrazolate.

2. A method for obtaining thiamine 3-carboxy-5-hydroxy- 1 - p - sulfophenyl - 4 - sulfophenylazopyrazolate which comprises reacting water-soluble salts of thiamine with water-soluble salts of 3-carboxy-5-hydroxy-1-p-sulfophenyl-4-sulfophenylazopyrazole in an aqueous medium and recovering the said salt thus produced from the reaction mixture.

References Cited in the file of this patent
UNITED STATES PATENTS

| 2,540,302 | Stecher et al. | Feb. 6, 1951 |
| 2,734,902 | Kuijvenhoven et al. | Feb. 14, 1956 |